(12) United States Patent
Cain

(10) Patent No.: US 6,606,325 B1
(45) Date of Patent: Aug. 12, 2003

(54) FAST PATH FORWARDING OF LINK STATE ADVERTISEMENTS USING MULTICAST ADDRESSING

(75) Inventor: Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/460,341

(22) Filed: Dec. 10, 1999

(51) Int. Cl.[7] .............................................. H04L 12/28
(52) U.S. Cl. ...................................... 370/410; 370/408
(58) Field of Search ............................... 370/236, 237, 370/238, 254, 256, 231, 351, 400, 408, 410

(56) References Cited

U.S. PATENT DOCUMENTS

| | | | | |
|---|---|---|---|---|
| 5,331,637 A | * | 7/1994 | Francis et al. ............... | 370/408 |
| 6,055,561 A | * | 4/2000 | Feldman et al. ............ | 370/236 |
| 6,252,856 B1 | * | 6/2001 | Zhang ......................... | 370/254 |
| 6,487,170 B1 | * | 11/2002 | Chen et al. .................. | 370/231 |

\* cited by examiner

Primary Examiner—Salvatore Cangialosi

(74) Attorney, Agent, or Firm—Steubing McGuinness & Manaras LLP

(57) ABSTRACT

A link state advertisement protocol message received from an originating device over an inbound interface is forwarded over the fast path according to a multicast distribution tree using a special multicast address. Specifically, a special multicast address is used for the link state advertisement protocol message. The special multicast address differentiates the link state advertisement protocol message from other protocol messages. A multicast routing protocol is used to establish a multicast distribution tree for distributing link state advertisement protocol messages based upon the special multicast address. The multicast distribution tree determines, among other things, the preferred inbound interface for the link state advertisement protocol message and any outbound interfaces to which the link state advertisement protocol message is to be forwarded. The link state advertisement protocol message is forwarded according to the multicast distribution tree. If the link state advertisement protocol message is received over the preferred inbound interface, then the link state advertisement protocol message is forwarded over the fast path to the outbound interface(s) as indicated by the multicast distribution tree. Otherwise, the link state advertisement protocol message is not forwarded over the fast path. The link state advertisement protocol message continues to be processed and forwarded by the control plane as usual for robustness.

28 Claims, 7 Drawing Sheets

FAST PATH FORWARDING OF LINK STATE ADVERTISEMENTS USING MULTICAST ADDRESSING

CROSS-REFERENCE TO RELATED APPLICATIONS

The present invention may be related to the following commonly-owned U.S. patent applications, which are hereby incorporated by reference in their entireties:

U.S. patent application Ser. No. 09/458,402 entitled FAST PATH FORWARDING OF LINK STATE ADVERTISEMENTS, filed on even date herewith in the name of Bradley Cain now pending;

U.S. patent application Ser. No. 09/458,403 entitled FAST PATH FORWARDING OF LINK STATE ADVERTISEMENTS USING REVERSE PATH FORWARDING, filed on even date herewith in the name of Bradley Cain now pending; and U.S. patent application Ser. No. 09/460,321 entitled FAST PATH FORWARDING OF LINK STATE ADVERTISEMENTS USING A MINIMUM SPANNING TREE, filed on even date herewith in the name of Bradley Cain now pending.

FIELD OF THE INVENTION

The present invention relates generally to communication systems, and more particulary to propagating link state advertisements in a communication network.

BACKGROUND OF THE INVENTION

In today's information age, it is typical for computers to be internetworked over a communication network. A common networking model uses a number of interconnected routers to route protocol messages (referred to hereinafter as packets) within the communication network. A router acts as a gateway between two or more network segments, and processes packets according to addressing information contained in the packets.

When a router receives a packet from a particular network segment, the router determines whether to drop the packet, process the packet, or forward the packet. Specifically, the router may drop the packet if the packet is destined for the same network segment from which it was received. The router may forward the packet if the packet is destined for a different network segment. The router may process the packet if the packet is destined for the router itself. For convenience, the router logic that forwards packets is referred to as the "fast path" of the router, while the router logic that processes packets is referred to as the "control plane" of the router.

In order for the fast path to forward packets, the router uses a routing protocol to determine network routes, and uses the network routes to build and maintain a forwarding table. The forwarding table includes forwarding entries mapping each destination address to a corresponding router interface based upon the network routes.

There are many different routing protocols in common use. One type of routing protocol, known as a "link state" routing protocol, an example of which is the Open Shortest Path First (OSPF) routing protocol, requires each router in the communication network to maintain a topology database describing the topology of the communication network. The topology database identifies each router in the communication network and the status of each router's links to other routers. Each router uses the topology information from its topology database to determine the network routes, typically using a shortest-path first technique for determining the network routes. The topology information, and therefore the forwarding table, is updated as network routes change.

In order for each router to maintain a topology database, each router must receive link state information from each of the other routers in the communication network. Therefore, each router sends link state advertisement (LSA) protocol messages to the other routers in the communication network indicating the status of each communication link maintained by the router. Typically, each router sends a LSA protocol message whenever the status of a communication link changes, and also sends a LSA protocol message periodically so that new routers receive the link state information in a timely manner. The LSA protocol messages are propagated to each of the other routers in the communication network.

When a router receives a LSA protocol message, the LSA protocol message is processed by the control plane of the router. The control plane updates the topology database according to the link state information in the LSA protocol message, and updates the forwarding table accordingly. The control plane may also forward the LSA protocol message to its neighboring routers.

Unfortunately, this control plane processing by each router can cause significant delay in propagating the LSA protocol messages to all routers in the communication network, especially in large communication networks having many routers. Consequently, there can be significant delay in recovering from network routing changes and outages, resulting in mis-routed packets, dropped packets, and overall performance degradation.

Thus, an improved technique for propagating LSA protocol messages is needed.

SUMMARY OF THE INVENTION

In accordance with one aspect of the invention, LSA protocol messages are forwarded over the fast path using multicast addressing. Specifically, a special multicast address is used for LSA protocol messages. Each router constructs a multicast distribution tree for forwarding LSA protocol messages addressed using the special multicast address.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention forwards LSA protocol messages by the fast path according to a predetermined forwarding scheme. This fast path forwarding of LSA protocol messages is done independently of any control plane processing, and therefore avoids the delays caused by the control plane processing. The fast path continues to route all received LSA protocol messages to the control plane as usual so that the control plane can obtain the topology information from the LSA protocol messages. Also, the control plane preferably forwards the LSA protocol messages as usual for robustness.

Figure 1:
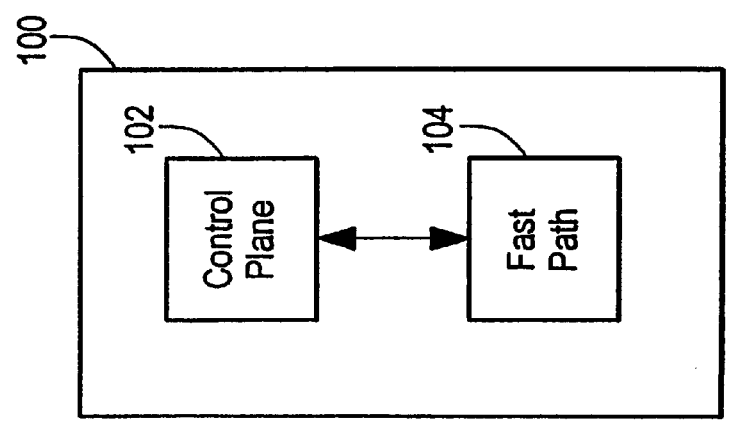
FIG. 1 is a block diagram showing the relevant logic blocks of an exemplary router in accordance with an embodiment of the present invention.

FIG. 1 is a block diagram showing the relevant logic blocks of an exemplary router 100. Among other things, the router includes a control plane 102 and a fast path 104. The fast path 104 performs filtering and forwarding of protocol messages, and routes control messages to the control plane 102. The control plane 102 processes control messages received from the fast path 104, and also sends protocol messages via the fast path 104.

Figure 2:
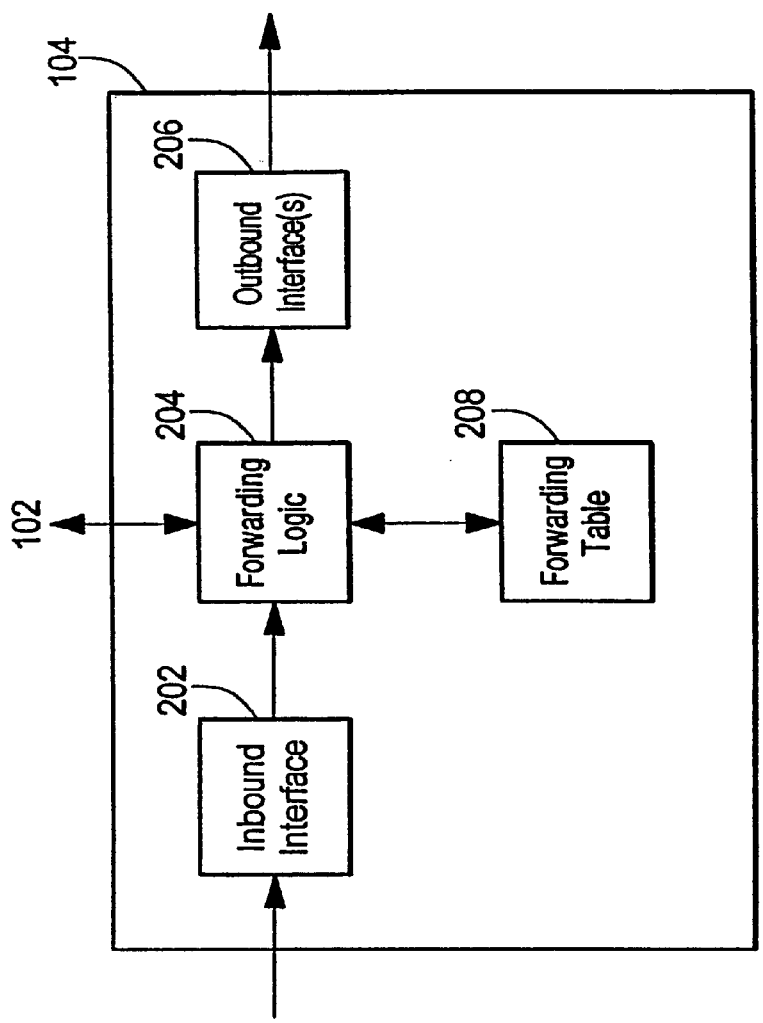
FIG. 2 is a block diagram showing the relevant logic blocks of the fast path in accordance with an embodiment of the present invention.

FIG. 2 is a block diagram showing the relevant logic blocks of the fast path 104. Among other things, the fast path 104 includes an inbound interface 202, forwarding logic 204, outbound interface(s) 206, and a forwarding table 208. The forwarding logic 104 performs packet filtering and forwarding functions based upon, among other things, the forwarding entries in the forwarding table 208. Specifically, upon receiving a packet from the inbound interface 202, the forwarding logic 204 may drop the packet, route the packet to the control plane 102, or forward the packet to the outbound interface(s) 206. Also, upon receiving a packet from the control plane 102, the forwarding logic may forward the packet to the outbound interface(s) 206.

Figure 3:
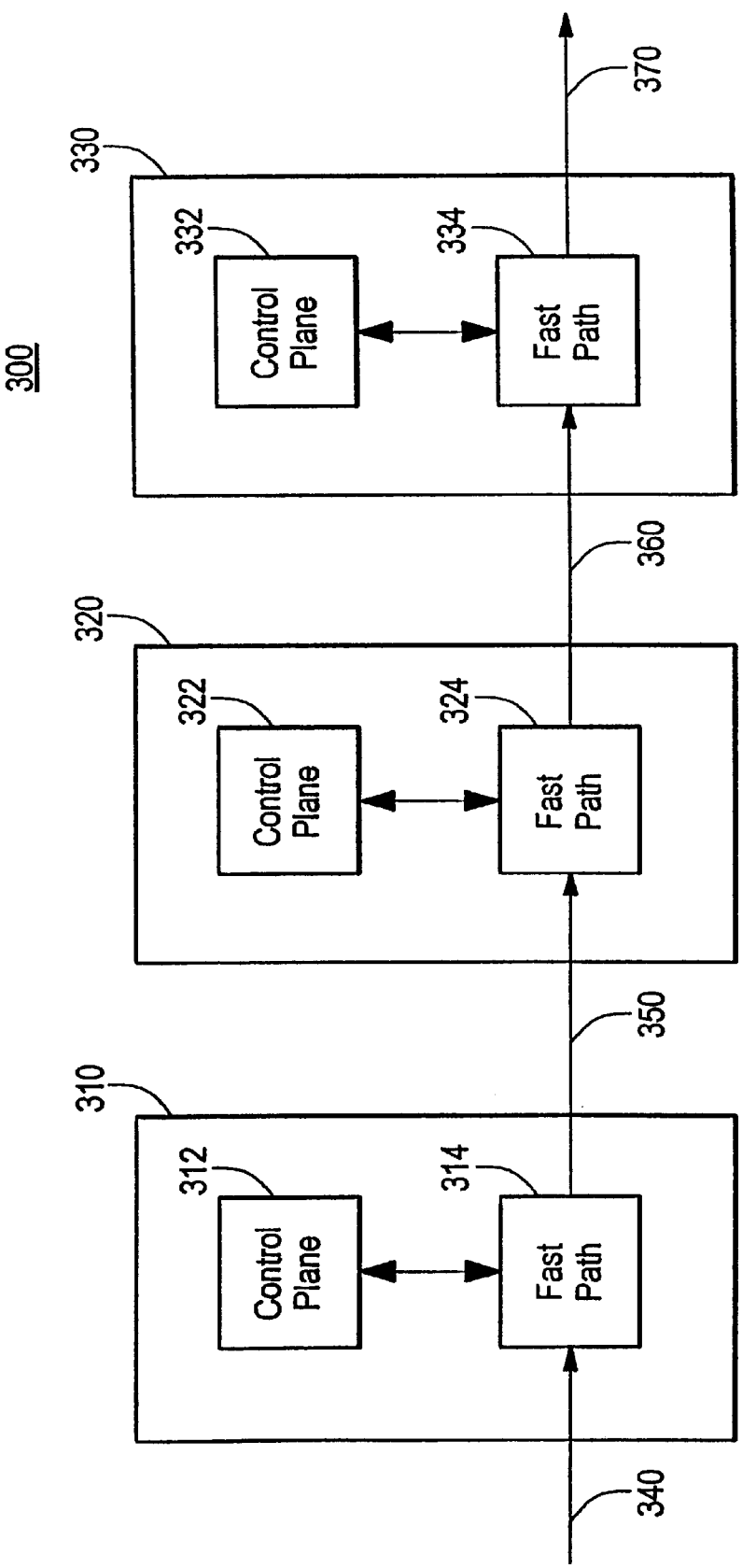
FIG. 3 is a block diagram showing an exemplary communication network in accordance with an embodiment of the present invention.

FIG. 3 is a block diagram showing an exemplary communication network 300 including three (3) interconnected routers, namely router 310, router 320, and router 330. Each router includes a control plane (312, 322, 332) and a fast path (314, 324, 334). Each router is connected to its neighboring router(s) via a fast path connection (340, 350, 360, 370).

Figure 4:
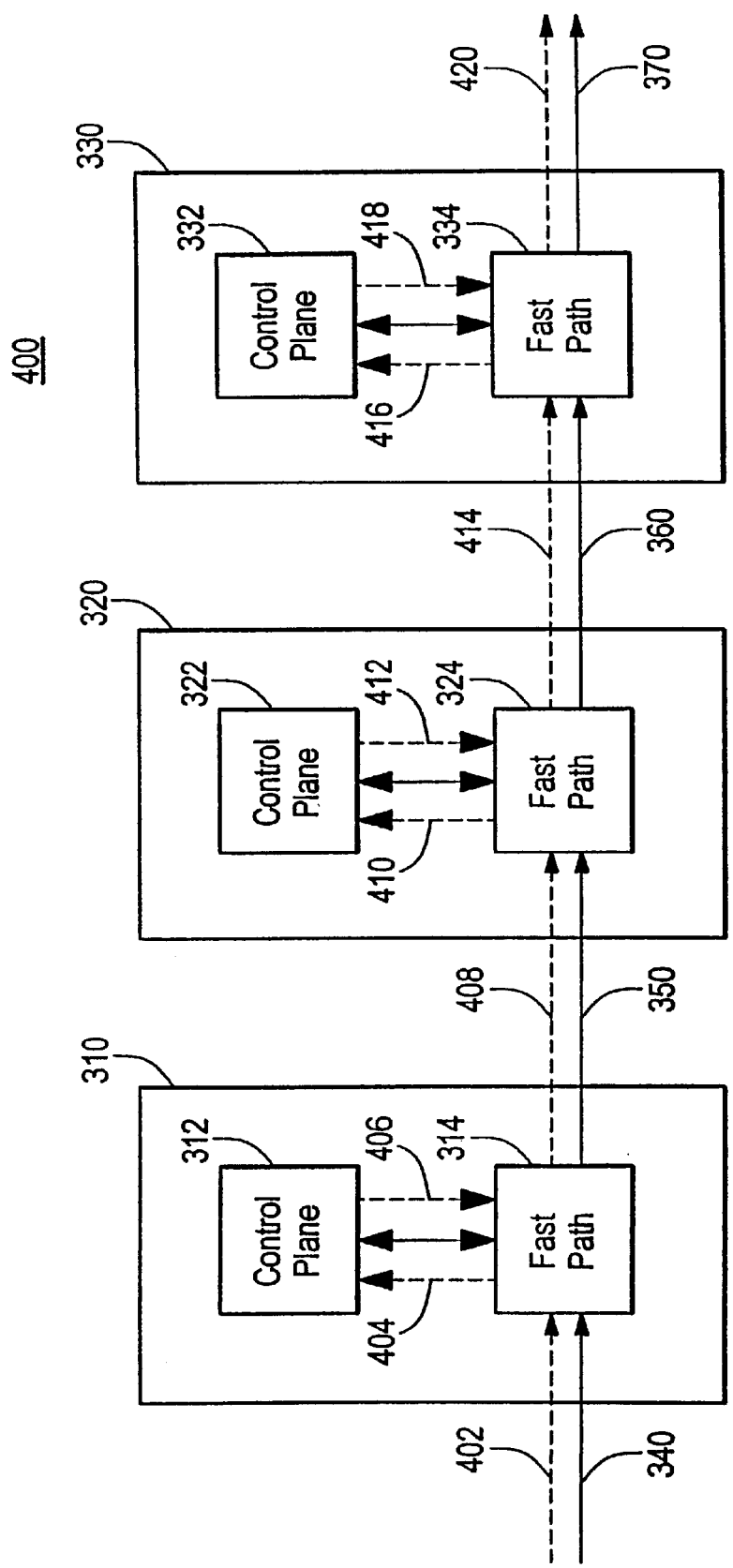
FIG. 4 is a block diagram showing the routing path of a link state advertisement protocol message in accordance with a prior art embodiment.

FIG. 4 shows the routing path of a LSA protocol message in an exemplary communication network 400 including the three (3) interconnected routers 310, 320, and 330. The LSA protocol message is propagated to all routers. Specifically, each router forwards the LSA protocol message to its neighboring router(s). Thus, the router 310 receives the LSA protocol message from its neighboring router, and forwards the LSA protocol message to the router 320. The router 320 receives the LSA protocol message from the router 310, and forwards the LSA protocol message to the router 330. The router 330 receives the LSA protocol message from the router 320, and forwards the LSA protocol message to its neighboring router.

More specifically, upon receiving the LSA protocol message by the router 310 over the routing path 402, the fast path 314, and particularly the forwarding logic of the fast path 314, routes the LSA protocol message to the control plane 312 over the routing path 404. The control plane 312 processes the LSA protocol message. Assuming the control plane 312 decides to forward the LSA protocol message, the control plane 312 forwards the LSA protocol message to the fast path 314 over the routing path 406. The fast path 314, and particularly the forwarding logic of the fast path 314, forwards the LSA protocol message to the router 320 over the routing path 408.

Upon receiving the LSA protocol message by the router 320 over the routing path 408, the fast path 324, and particularly the forwarding logic of the fast path 324, routes the LSA protocol message to the control plane 322 over the routing path 410. The control plane 322 processes the LSA protocol message. Assuming the control plane 322 decides to forward the LSA protocol message, the control plane 322 forwards the LSA protocol message to the fast path 324 over the routing path 412. The fast path 324, and particularly the forwarding logic of the fast path 324, forwards the LSA protocol message to the router 330 over the routing path 414.

Upon receiving the LSA protocol message by the router 330 over the routing path 414, the fast path 334, and particularly the forwarding logic of the fast path 334, routes the LSA protocol message to the control plane 332 over the routing path 416. The control plane 332 processes the LSA protocol message. Assuming the control plane 332 decides to forward the LSA protocol message, the control plane 332 forwards the LSA protocol message to the fast path 334 over the routing path 418. The fast path 334, and particularly the forwarding logic of the fast path 334, forwards the LSA protocol message to its neighboring router(s) over the routing path 420.

The process of routing the LSA protocol message to the control plane and forwarding LSA protocol message by the control plane, in and of itself, causes delays in propagating the LSA protocol message to all routers in the communication network. The amount of processing performed by the control plane only worsens the delays in propagating the LSA protocol message to all routers in the communication network. The amount of processing performed by the control plane can be significant, depending on the routing protocol and certain operational parameters. For example, the control plane processing for an OSPF LSA protocol message includes, among other things, verifying an Internet Protocol (IP) checksum for the LSA protocol message, verifying an OSPF checksum for the LSA protocol message, determining whether the LSA protocol message is intended for the router, determining whether the LSA protocol message is received for the correct network area, determining whether the LSA protocol message is a duplicate of a previously received LSA protocol message, determining whether the LSA protocol message has reached its maximum age, determining outbound interface(s), and determining the status of neighboring routers. When authentication is enabled, the control plane processing for an OSPF LSA protocol message also includes authenticating the LSA protocol message using a MD5 one-way hash function calculation, which adds even more delays in propagating the LSA protocol message to all routers in the communication network.

Therefore, in a preferred embodiment of the present invention, a router forwards LSA protocol messages over the fast path using a minimum spanning tree.

Figure 5:
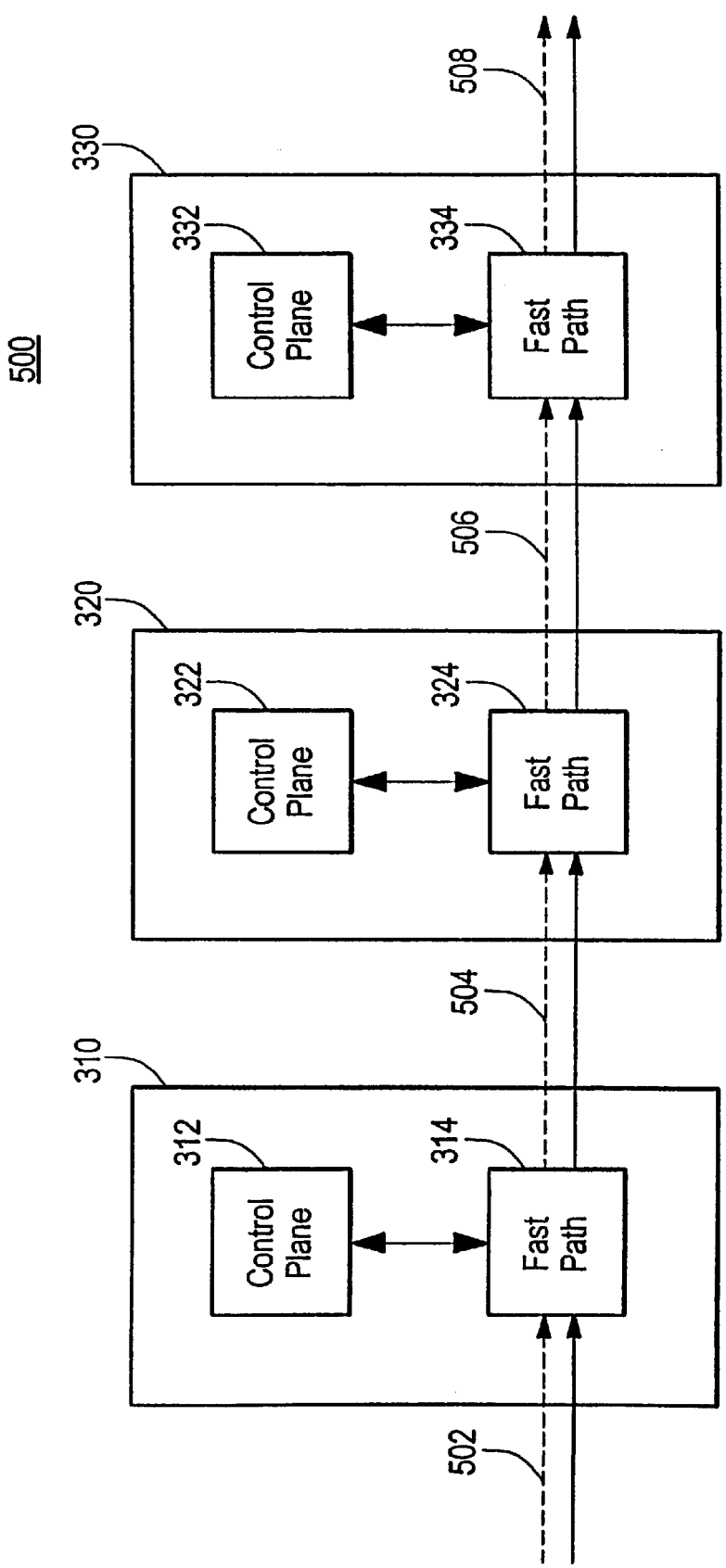
FIG. 5 is a block diagram showing the routing path of a link state advertisement protocol message in accordance with an embodiment of the present invention.

FIG. 5 shows the routing path of a LSA protocol message in an exemplary communication network 500 including the three (3) interconnected routers 310, 320, and 330. The LSA protocol message is propagated to all routers. Specifically, each router forwards the LSA protocol message to its neighboring router(s). Thus, upon receiving the LSA protocol message by the router 310 over the routing path 502, the fast path 314, and particularly the forwarding logic of the fast path 314, routes the LSA protocol message to the router 320 over the routing path 504. Upon receiving the LSA protocol message by the router 320 over the routing path 504, the fast path 324, and particularly the forwarding logic of the fast path 324, routes the LSA protocol message to the router 330 over the routing path 506. Upon receiving the LSA protocol message by the router 330 over the routing path 506, the fast path 334, and particularly the forwarding logic of the fast path 334, routes the LSA protocol message to its neighboring router(s) over the routing path 508.

Figure 6:
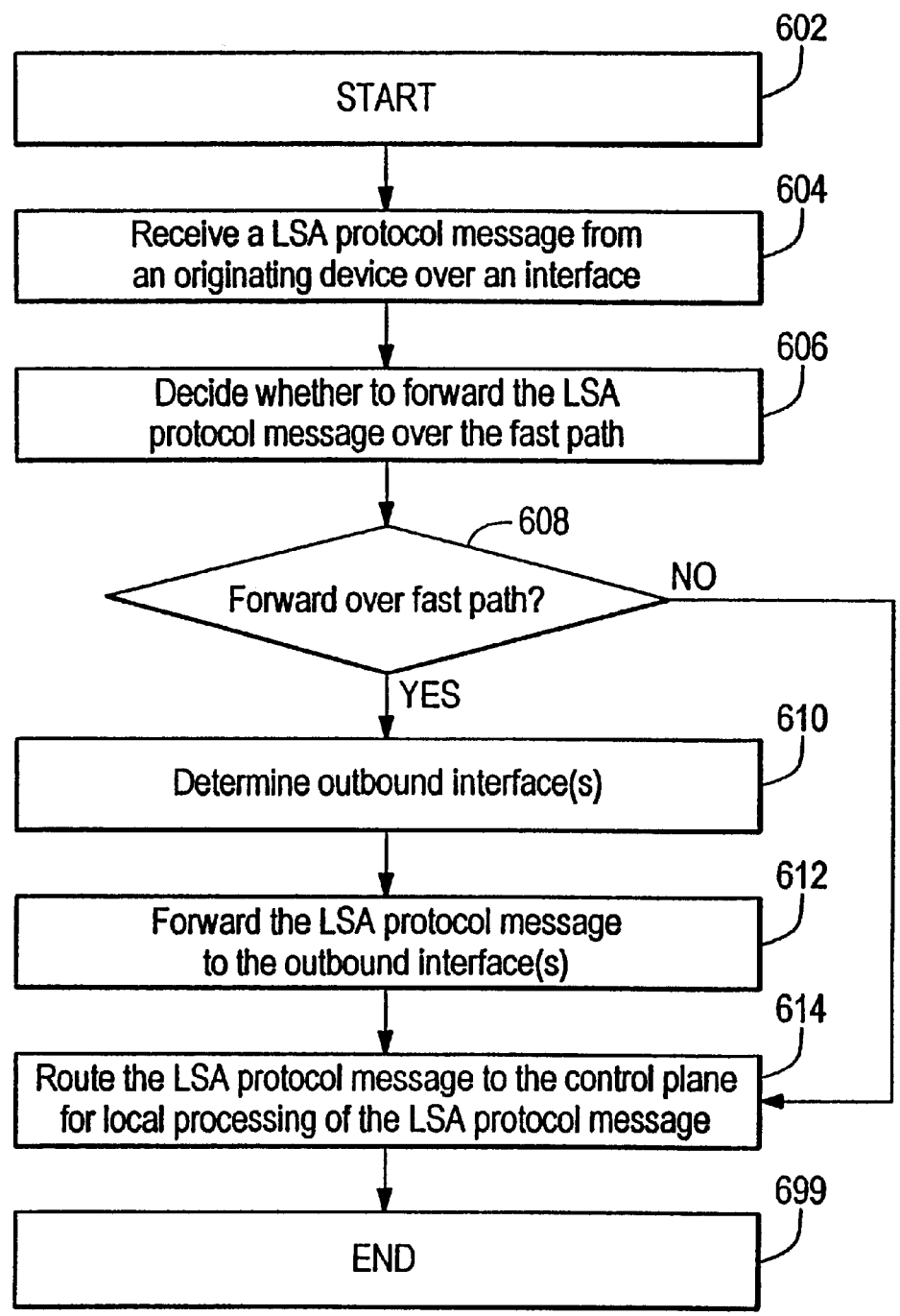
FIG. 6 is a logic flow diagram showing exemplary logic 600 for processing a LSA protocol message in accordance with an embodiment of the present invention.

FIG. 6 is a logic flow diagram showing exemplary logic 600 for processing a LSA protocol message. Beginning at step 602, and upon receiving a LSA protocol message from an originating device over an interface, in step 604, the logic decides whether to forward the LSA protocol message over the fast path, in step 606. If the logic decides to forward the LSA protocol message over the fast path (YES in step 608), then the logic determines the outbound interface(s), in step 610, and forwards the LSA protocol message to the outbound interface(s), in step 612. Whether or not the logic forwards the LSA protocol message over the fast path, the logic routes the LSA protocol message to the control plane for local processing of the LSA protocol message, in step 614. The logic 600 terminates in step 699.

An embodiment of the present invention utilizes multicast addressing to forward the LSA protocol message over the fast path. Specifically, in order to propagate LSA protocol messages from a particular originating device to all other routers, the originating device is considered to be the multicast source, and all other routers are considered to be multicast group members. A special multicast address is used for addressing the LSA protocol messages to the multicast group members. The special multicast address differentiates the LSA protocol messages from other protocol messages. Furthermore, unlike the address that is used to propagate LSA protocol messages hop-by-hop, which is treated like a local link address, the special multicast address is not treated like a local link address, but is instead treated as a true multicast address for distributing the LSA protocol message to all multicast group members.

More specifically, each router uses a multicast routing protocol to establish a multicast distribution tree for LSA protocol messages that originate from the originating device, and in particular for LSA protocol messages addressed to the multicast group members using the special multicast address. The multicast distribution tree determines, among other things, the preferred inbound interface for the LSA protocol messages and any outbound interfaces to which the LSA protocol message are to be forwarded. The router installs a multicast forwarding state in the forwarding table indicating the inbound and outbound interfaces for LSA protocol messages. For convenience, such a multicast forwarding state is referred to as a (S,G) state, where S is the multicast source address for the originating device, and G is the special multicast address for the multicast group members.

The originating device uses the special multicast address as the destination address for all LSA protocol messages that it originates. When the router receives a LSA protocol message having a destination address equal to the special multicast address over an inbound interface, the router determines whether or not to forward the LSA protocol message over the fast path according to the multicast distribution tree. Specifically, the router searches the forwarding table for a multicast forwarding state associated with the (S,G) pair. Assuming the router finds the multicast forwarding state, then the router determines whether or not the inbound interface is the preferred inbound interface for the (S,G) pair according to the multicast forwarding state. If the inbound interface is the preferred inbound interface, then the router forwards the LSA protocol message by the fast path to all outbound interfaces indicated by the multicast forwarding state. If the inbound interface is not the preferred inbound interface, then the router does not forward the LSA protocol message by the fast path. In either case, the LSA protocol message is routed to the control plane for local processing of the LSA protocol message. The control plane processes and forwards the LSA protocol message as usual for robustness.

Figure 7:
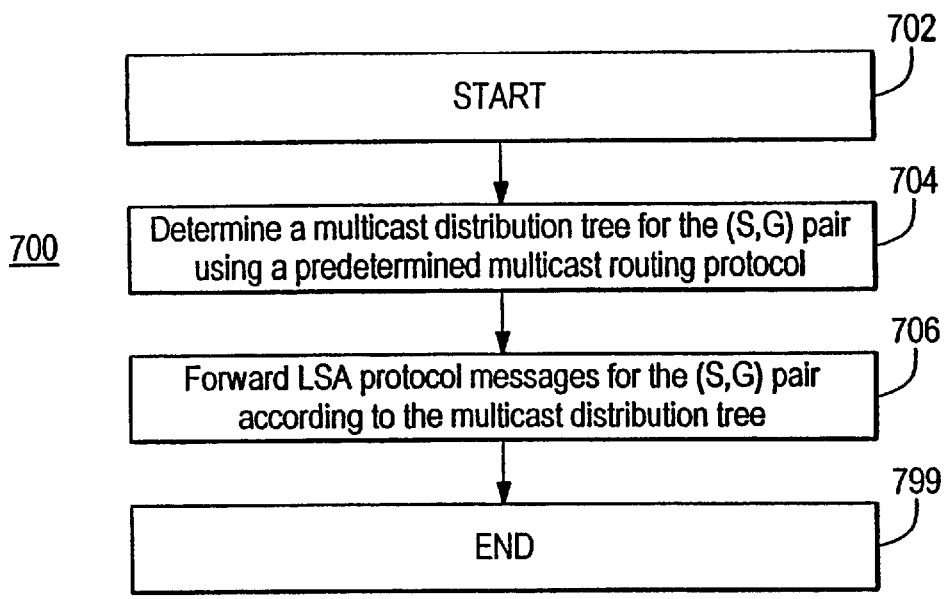
FIG. 7 is a logic flow diagram showing exemplary logic 700 for forwarding a LSA protocol message using multicast addressing according to a multicast distribution tree in accordance with an embodiment of the present invention.

FIG. 7 is a logic flow diagram showing exemplary logic 700 for forwarding a LSA protocol message using multicast addressing according to a multicast distribution tree. Beginning at step 702, the logic determines a multicast distribution tree for the (S,G) pair using a predetermined multicast routing protocol, in step 704. The logic then forwards LSA protocol messages for the (S,G) pair according to the multicast distribution tree, in step 706. The logic 700 terminates in step 799.

Figure 8:
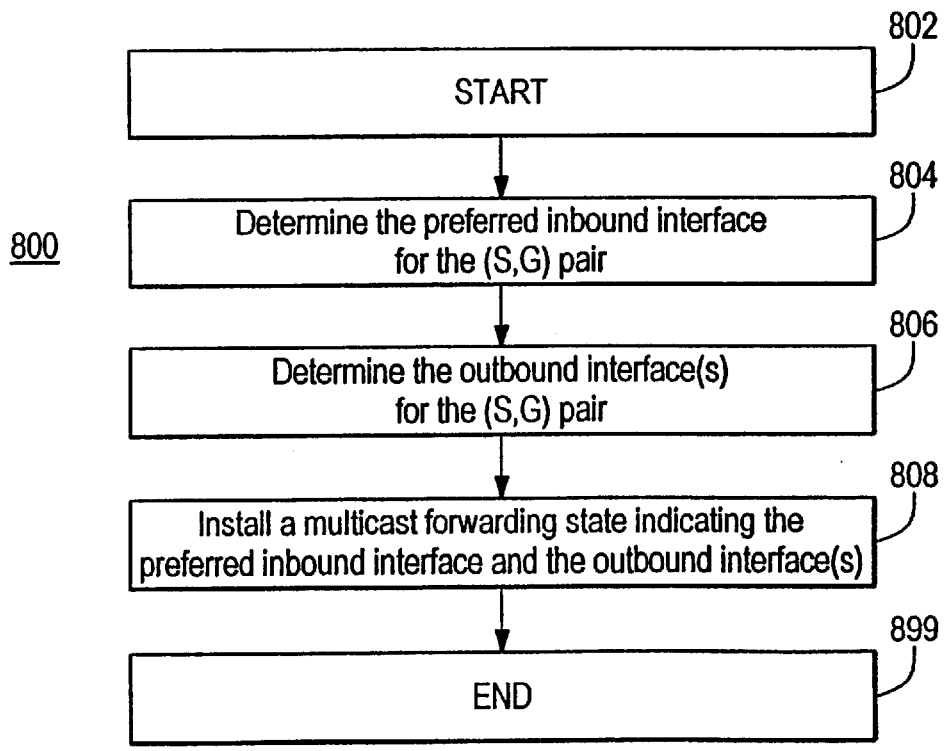
FIG. 8 is a logic flow diagram showing exemplary logic 800 for installing a multicast forwarding state for forwarding LSA protocol messages in accordance with an embodiment of the present invention.

FIG. 8 is a logic flow diagram showing exemplary logic 800 for installing a multicast forwarding state for forwarding LSA protocol messages. Beginning at step 802, the logic determines the preferred inbound interface for the (S,G) pair, in step 804. The logic also determines the outbound interface(s) for the (S,G) pair, in step 806. The logic then installs a multicast forwarding state indicating the preferred inbound interface and the outbound interface(s), in step 808. The logic 800 terminates in step 899.

Figure 9:
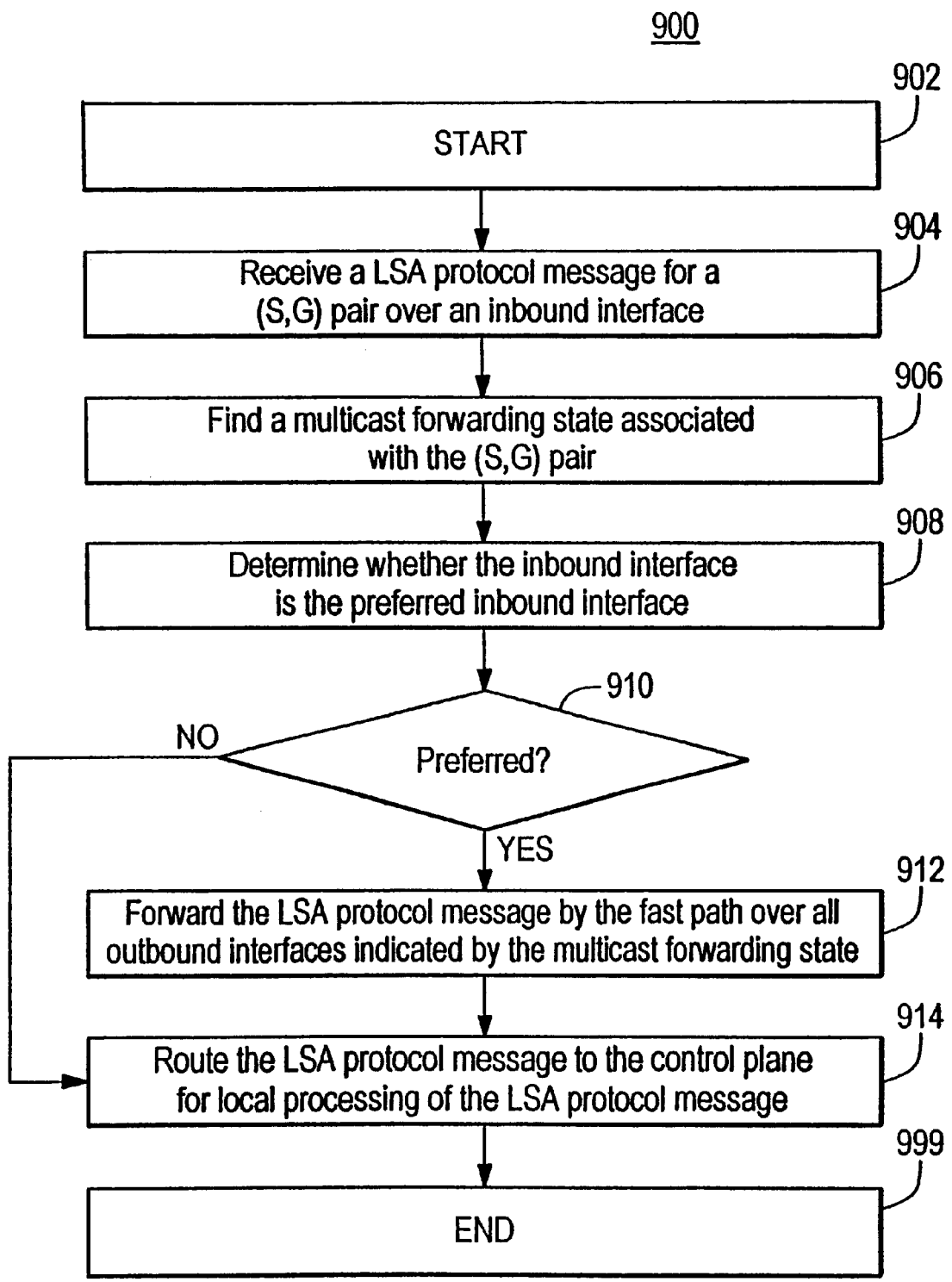
FIG. 9 is a logic flow diagram showing exemplary logic 900 for processing a LSA protocol message in accordance with an embodiment of the present invention.

FIG. 9 is a logic flow diagram showing exemplary logic 900 for processing a LSA protocol message. Beginning at step 902, and upon receiving a LSA protocol message for a (S,G) pair over an inbound interface, in step 904, the logic finds a multicast forwarding state associated with the (S,G) pair, in step 906. The multicast forwarding state indicates, among other things, the preferred inbound interface and the outbound interface(s) for the (S,G) pair. The logic then determines whether the inbound interface is the preferred inbound interface for the (S,G) pair, in step 908, specifically by determining whether the inbound interface is the preferred inbound interface indicated by the multicast forwarding state. If the inbound interface is the preferred inbound interface (YES in step 910), then the logic proceeds to forward the LSA protocol message by the fast path over all outbound interfaces indicated by the multicast forwarding state, in step 912. If the inbound interface is not the preferred inbound interface (NO in step 910), then the logic does not forward the LSA protocol message by the fast path. In either case, the logic preferably routes the LSA protocol message to the control plane for local processing of the LSA protocol message, in step 914. The logic 900 terminates in step 999.

In a preferred embodiment of the present invention, predominantly all of the logic for propagating a LSA protocol message using multicast addressing is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for propagating link state advertisement protocol messages by a network device in a communication network. The network device includes a plurality of interfaces, a fast path for forwarding protocol messages, and a control plane for processing protocol messages. The method involves determining a multicast distribution tree for forwarding link state advertisement protocol messages from an originating device S to a multicast group G, receiving a link state advertisement protocol message for the (S,G) pair over an inbound interface, and forwarding the link state advertisement protocol message by the fast path according to the multicast distribution tree associated with the (S,G) pair. Determining the multicast distribution tree for forwarding link state advertisement protocol messages from an originating device S to a multicast group G involves running a multicast routing protocol to determine the multicast distribution tree. The multicast distribution tree identifies a preferred inbound interface for the (S,G) pair and outbound interface(s) for the (S,G) pair. The method typically involves installing a multicast forwarding state for the (S,G) pair in a forwarding table, the multicast forwarding state indicating rules for forwarding link state advertisement protocol messages associated with the (S,G) pair. The multicast forwarding state indicates a preferred inbound interface for the (S,G) pair and outbound interface(s) for the (S,G) pair. Forwarding the link state advertisement protocol message by the fast path according to the multicast distribution tree associated with the (S,G) pair involves determining whether the inbound interface is the preferred inbound interface for the (S,G) pair and forwarding the link state advertisement protocol message by the fast path, if and only if the inbound interface is the preferred inbound interface for the (S,G) pair. Determining whether the inbound interface is the preferred inbound interface for the (S,G) pair typically involves finding a multicast forwarding state in a forwarding table, the multicast forwarding state indicating the preferred inbound interface for the (S,G) pair and determining whether the inbound interface is the preferred inbound interface indicated by the multicast forwarding state. The method preferably involves routing the link state advertisement protocol message to the control plane for local processing of the link state advertisement protocol message.

The present invention may also be embodied as a device for propagating a link state advertisement protocol message in a communication network. The device includes a plurality of interfaces, a control plane for processing protocol messages, and a fast path coupled to the control plane and to the plurality of interfaces. The fast path includes receiving logic for receiving a link state advertisement protocol message from an originating device S to a multicast group G and fast path forwarding logic for forwarding the link state advertisement protocol message according to a multicast distribution tree for the (S,G) pair. The device typically also includes multicast routing protocol logic for determining the multicast distribution tree for the (S,G) pair. The device typically also includes forwarding state installation logic for installing a multicast forwarding state in a forwarding table indicating rules for forwarding the link state advertisement protocol messages associated with the (S,G) pair, such as a preferred inbound interface for the (S,G) pair and outbound interface(s) for the (S,G) pair. The device typically includes a forwarding table having at least one multicast forwarding state indicating a preferred inbound interface and outbound interface(s) for the (S,G) pair identified by the multicast distribution tree. The fast path forwarding logic forwards the link state advertisement protocol message to all outbound interfaces indicated by the multicast forwarding state, if and only if the inbound interface is the preferred inbound interface indicated by the multicast forwarding state. The fast path forwarding logic preferably routes the link state advertisement protocol message to the control plane for local processing of the link state advertisement protocol message.

The present invention may also be embodied as a computer program product for use in a network device having a plurality of interfaces, a fast path for forwarding protocol messages, and a control path for processing control messages. The computer program product includes receiving logic for receiving a link state advertisement protocol message from an originating device S to a multicast group G and fast path forwarding logic for forwarding the link state advertisement protocol message according to a multicast distribution tree for the (S,G) pair.

The present invention may also be embodied as a method for propagating link state advertisement protocol messages involving sending a link state advertisement protocol message by an originating device S to at least one network device using a multicast group address G and forwarding the link state advertisement protocol message by the network device over the fast path according to a multicast distribution tree associated with the (S,G) pair.

The present invention may be embodied in other specific forms without departing from the essence or essential characteristics. The described embodiments are to be considered in all respects only as illustrative and not restrictive.

I claim:

1. A method for propagating link state advertisement protocol messages by a network device in a communication network, the network device having a plurality of interfaces, a fast path for forwarding protocol messages, and a control plane for processing protocol messages, the method comprising:

determining a multicast distribution tree for forwarding link state advertisement protocol messages from an originating device S to a multicast group G;

receiving a link state advertisement protocol message for the (S,G) pair over an inbound interface; and forwarding the link state advertisement protocol message by the fast path according to the multicast distribution tree associated with the (S,G) pair independently of any control plane processing of the link state advertisement protocol message.

2. The method of claim 1, wherein determining a multicast distribution tree for forwarding link state advertisement protocol messages from an originating device S to a multicast group G comprises:

running a multicast routing protocol to determine the multicast distribution tree.

3. The method of claim 2, wherein the multicast distribution tree identifies a preferred inbound interface for the (S,G) pair.

4. The method of claim 2, wherein the multicast distribution tree identifies outbound interface(s) for the (S,G) pair.

5. The method of claim 2, further comprising:

installing a multicast forwarding state for the (S,G) pair in a forwarding table, the multicast forwarding state indicating rules for forwarding link state advertisement protocol messages associated with the (S,G) pair.

6. The method of claim 5, wherein the multicast forwarding state indicates a preferred inbound interface for the (S,G) pair.

7. The method of claim 5, wherein the multicast forwarding state indicates outbound interface(s) for the (S,G) pair.

8. The method of claim 1, wherein the multicast distribution tree identifies a preferred inbound interface for the (S,G) pair, and wherein forwarding the link state advertisement protocol message by the fast path according to the multicast distribution tree associated with the (S,G) pair comprises:

determining whether the inbound interface is the preferred inbound interface for the (S,G) pair; and forwarding the link state advertisement protocol message by the fast path, if and only if the inbound interface is the preferred inbound interface for the (S,G) pair.

9. The method of claim 8, wherein determining whether the inbound interface is the preferred inbound interface for the (S,G) pair comprises:

finding a multicast forwarding state in a forwarding table, the multicast forwarding state indicating the preferred inbound interface for the (S,G) pair; and determining whether the inbound interface is the preferred inbound interface indicated by the multicast forwarding state.

10. The method of claim 1, further comprising:

routing the link state advertisement protocol message to the control plane for local processing of the link state advertisement protocol message.

11. The method of claim 10, further comprising:

forwarding the link state advertisement protocol message by the control plane via the fast path.

12. A device for propagating a link state advertisement protocol message in a communication network, the device comprising:

a plurality of interfaces;

a control plane for processing protocol messages; and a fast path coupled to the control plane and to the plurality of interfaces, the fast path comprising:

receiving logic operably coupled to receive a link state advertisement protocol message from an originating device S to a multicast group G; and fast path forwarding logic responsive to the receiving logic and operably coupled to forward the link state advertisement protocol message according to a multicast distribution tree for the (S,G) pair independently of any control plane processing of the link state advertisement protocol message.

13. The device of claim 12, further comprising:

multicast routing protocol logic operably coupled to determine the multicast distribution tree for the (S,G) pair.

14. The device of claim 13, further comprising:

forwarding state installation logic responsive to the multicast routing protocol logic and operably coupled to install a multicast forwarding state in a forwarding table indicating rules for forwarding the link state advertisement protocol messages associated with the (S,G) pair.

15. The device of claim 14, wherein the multicast forwarding state indicates a preferred inbound interface for the (S,G) pair.

16. The device of claim 14, wherein the multicast forwarding state indicates outbound interface(s) for the (S,G) pair.

17. The device of claim 12, further comprising a forwarding table having at least one multicast forwarding state indicating a preferred inbound interface and outbound interface(s) for the (S,G) pair identified by the multicast distribution tree.

18. The device of claim 17, wherein the fast path forwarding logic is operably coupled to forward the link state advertisement protocol message to all outbound interfaces indicated by the multicast forwarding state, if and only if the inbound interface is the preferred inbound interface indicated by the multicast forwarding state.

19. The device of claim 12, wherein the fast path forwarding logic is operably coupled to route the link state advertisement protocol message to the control plane for local processing of the link state advertisement protocol message.

20. The device of claim 19, wherein the control plane is operably coupled to forward the link state advertisement protocol message via the fast path.

21. A program product comprising a computer readable medium having embodied therein a computer program for propagating a link state advertisement protocol message by a network device in a communication network, the network device having a plurality of interfaces, a fast path for forwarding protocol messages, and a control path for processing control messages, the computer program comprising:

receiving logic programmed to receive a link state advertisement protocol message from an originating device S to a multicast group G; and fast path forwarding logic responsive to the receiving logic and programmed to forward the link state advertisement protocol message according to a multicast distribution tree for the (S,G) pair.

22. The program product of claim 21, wherein the computer program further comprises:

multicast routing protocol logicprogrammed to determine the multicast distribution tree for the (S,G) pair.

23. The program product of claim 22, wherein the computer program further comprises:

forwarding state installation logic responsive to the multicast routing protocol logic and programmed to install a multicast forwarding state in a forwarding table indicating rules for forwarding the link state advertisement protocol messages associated with the (S,G) pair.

24. The program product of claim 23, wherein the multicast forwarding state indicates a preferred inbound interface for the (S,G) pair.

25. The program product of claim 23, wherein the multicast forwarding state indicates outbound interface(s) for the (S,G) pair.

26. The program product of claim 21, wherein the network device includes a forwarding table having at least one multicast forwarding state indicating a preferred inbound interface and outbound interface(s) for the (S,G) pair identified by the multicast distribution tree, and wherein the fast path forwarding logic is programmed to forward the link state advertisement protocol message to all outbound interfaces indicated by the multicast forwarding state, if and only if the inbound interface is the preferred inbound interface indicated by the multicast forwarding state.

27. The program product of claim 21, wherein the fast path forwarding logic is programmed to route the link state advertisement protocol message to the control plane for local processing of the link state advertisement protocol message.

28. In a communication system having a plurality of interconnected network devices, each network device having a plurality of interfaces, a fast path for forwarding protocol messages, and a control plane for processing protocol message, a method for propagating link state advertisement protocol messages, the method comprising:

sending a link state advertisement protocol message by an originating device S to at least one network device using a multicast group address G; and forwarding the link state advertisement protocol message by the network device over the fast path according to a multicast distribution tree associated with the (S,G) pair independently of any control plane processing of the link state advertisement protocol message.

* * * * *